J. RIISE.
TRACTOR.
APPLICATION FILED MAR. 27, 1919.
1,355,501.
Patented Oct. 12, 1920.
6 SHEETS—SHEET 1.
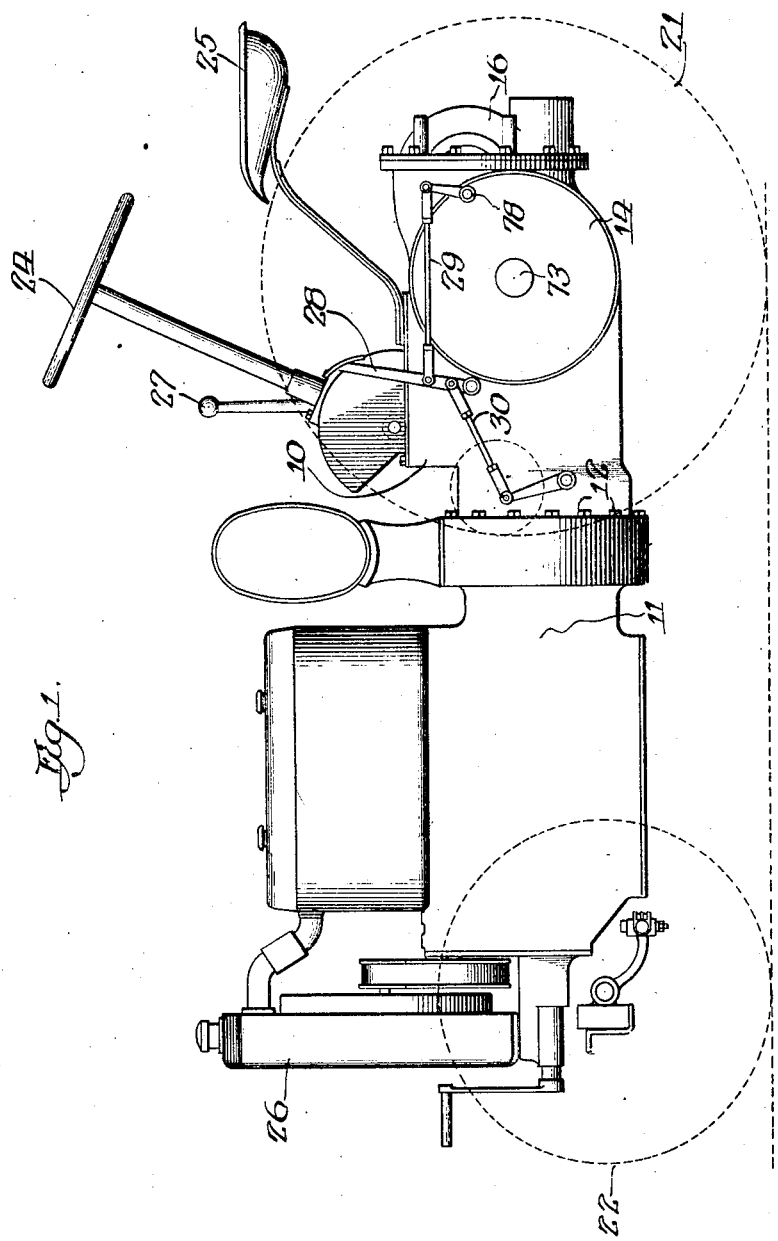
Witnesses:
Inventor:
John Riise.
By Wilkinson & Huxley
Attys.

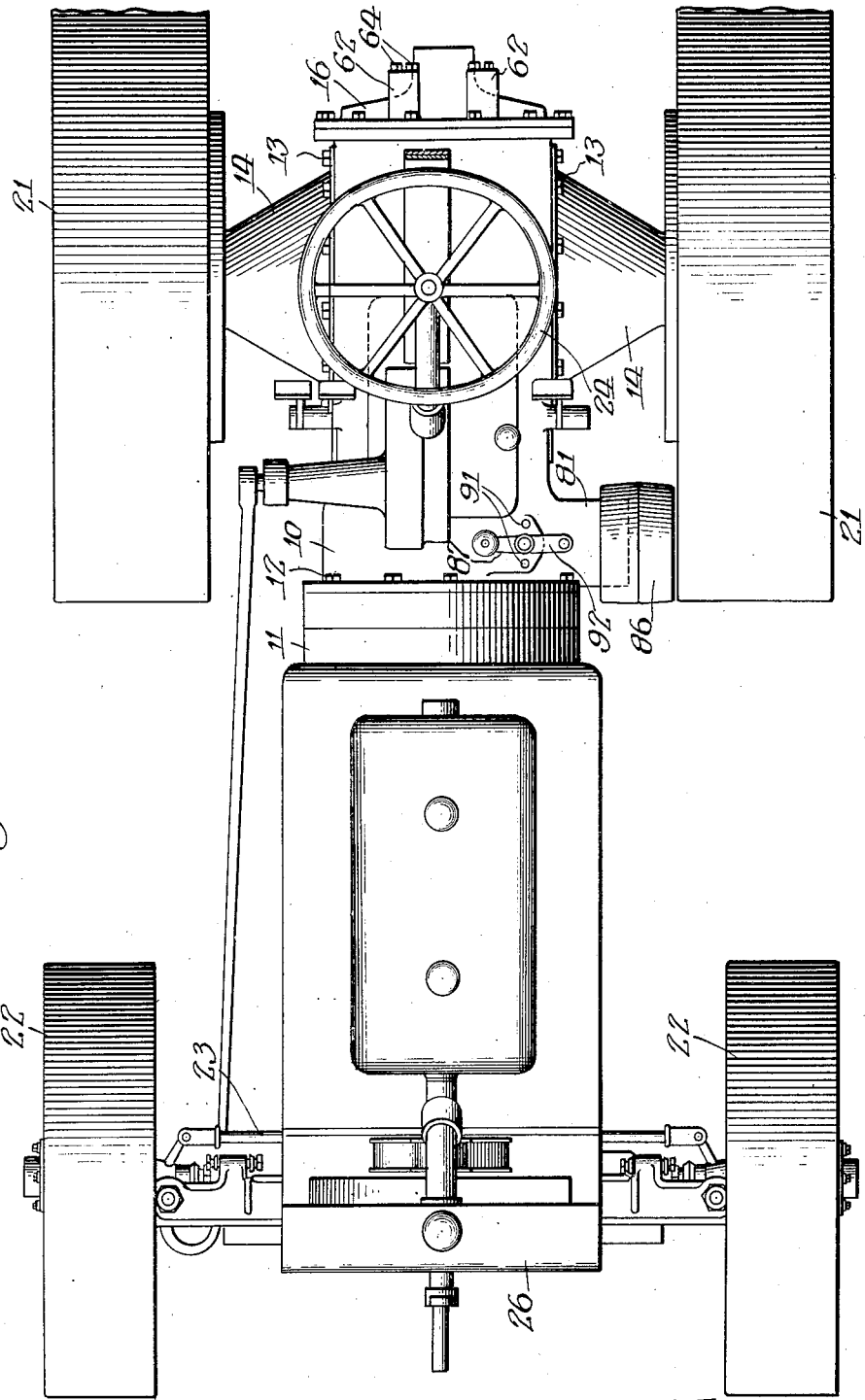

J. RIISE.
TRACTOR.
APPLICATION FILED MAR. 27, 1919.
1,355,501.
Patented Oct. 12, 1920.
6 SHEETS—SHEET 3.
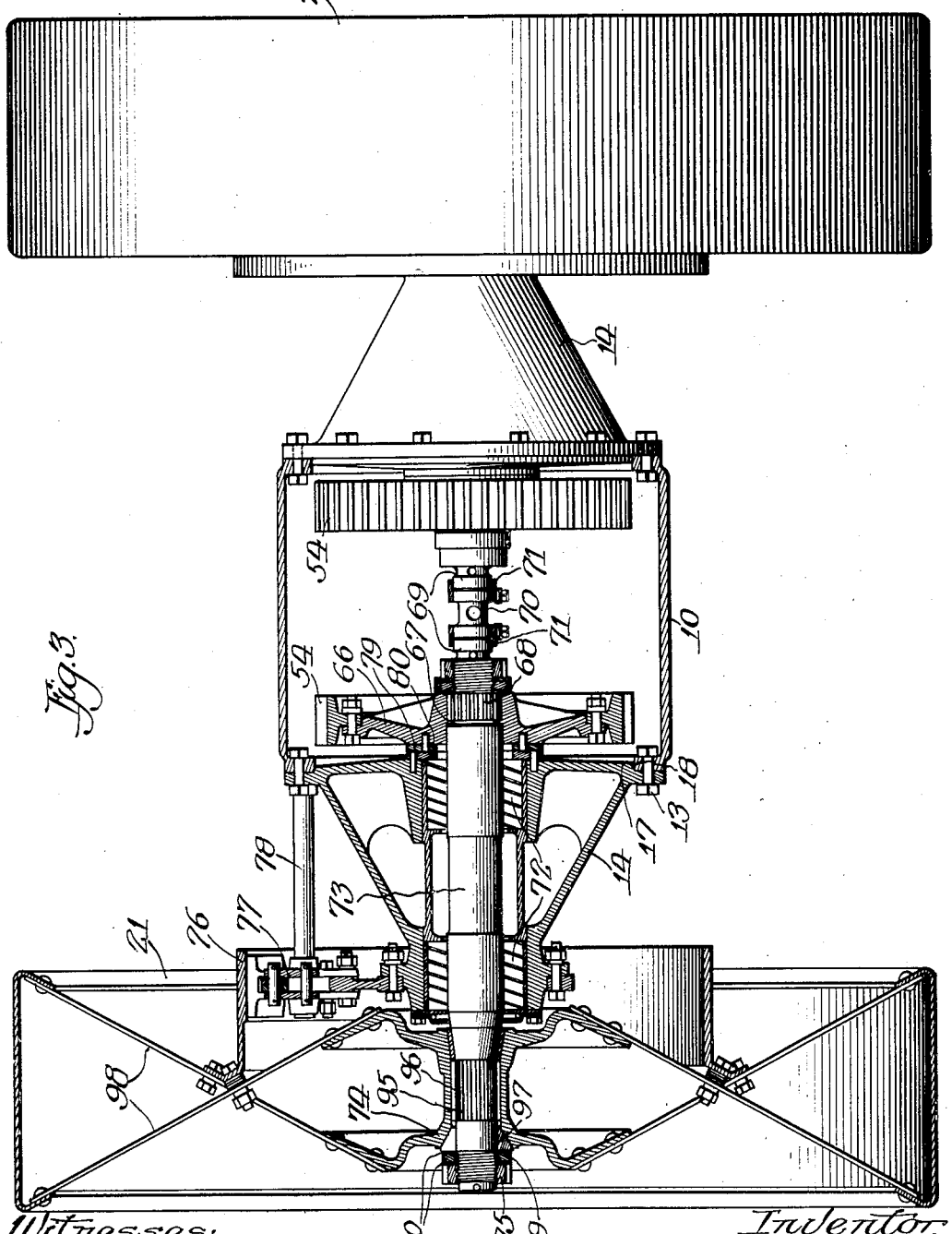

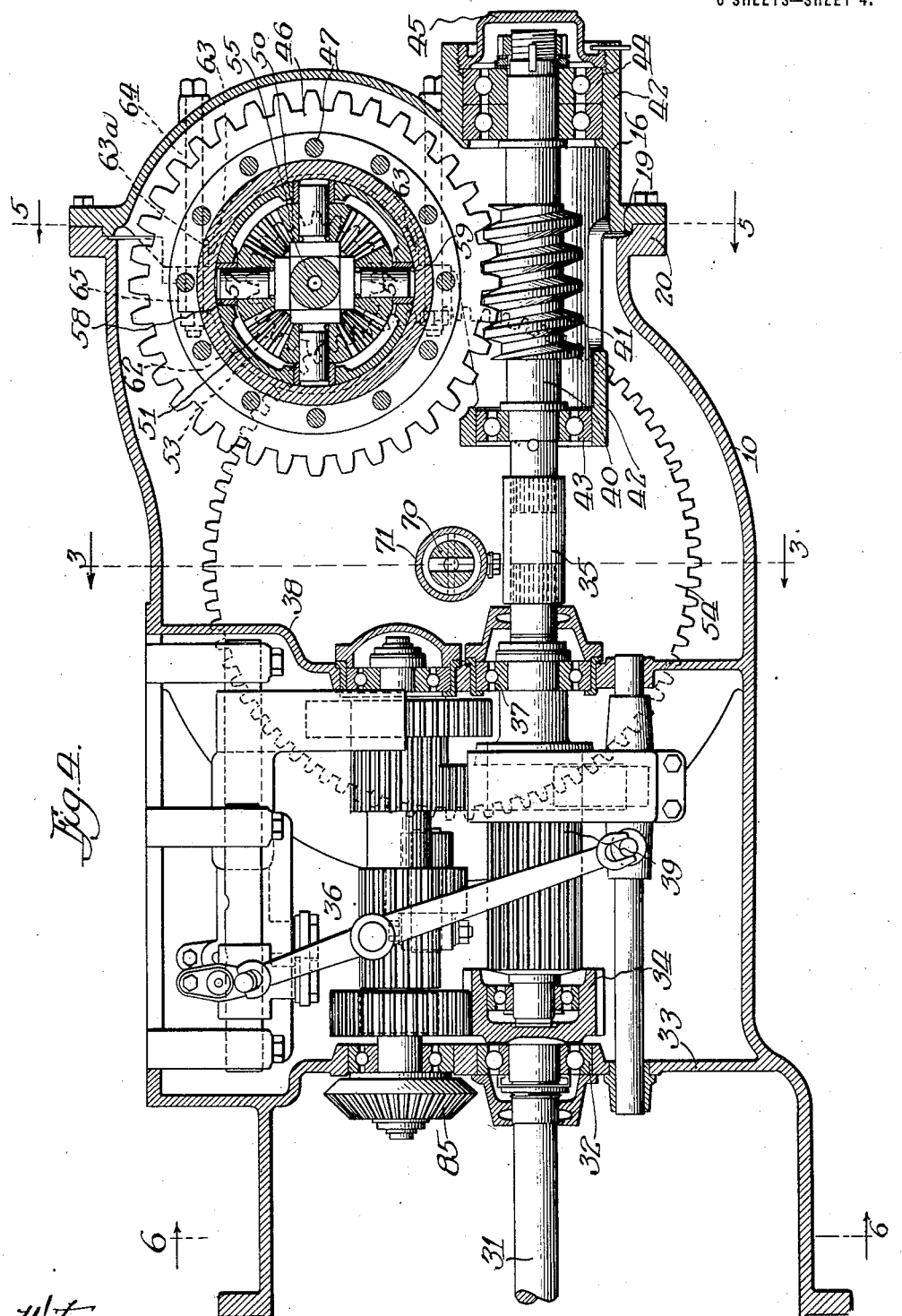

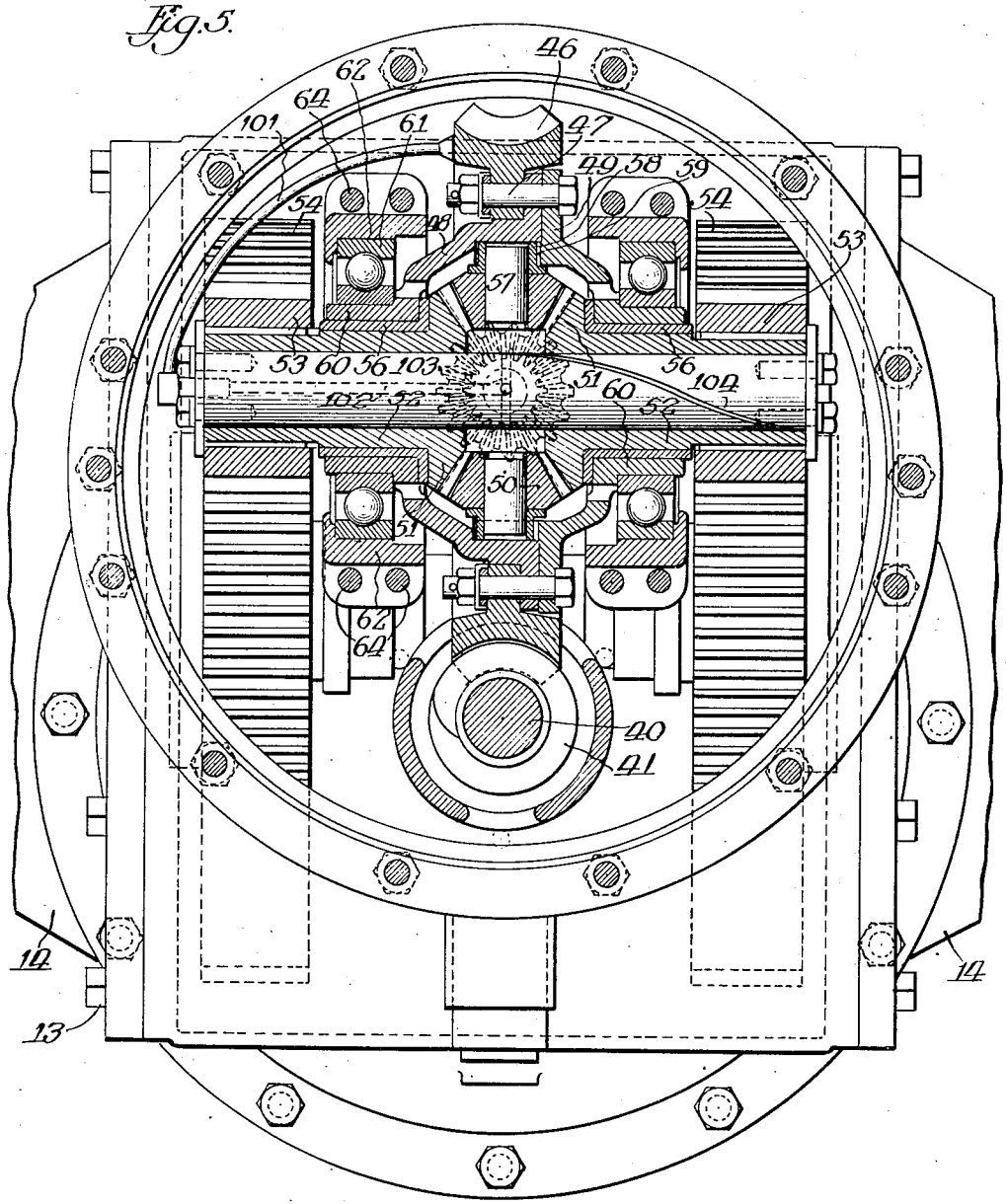

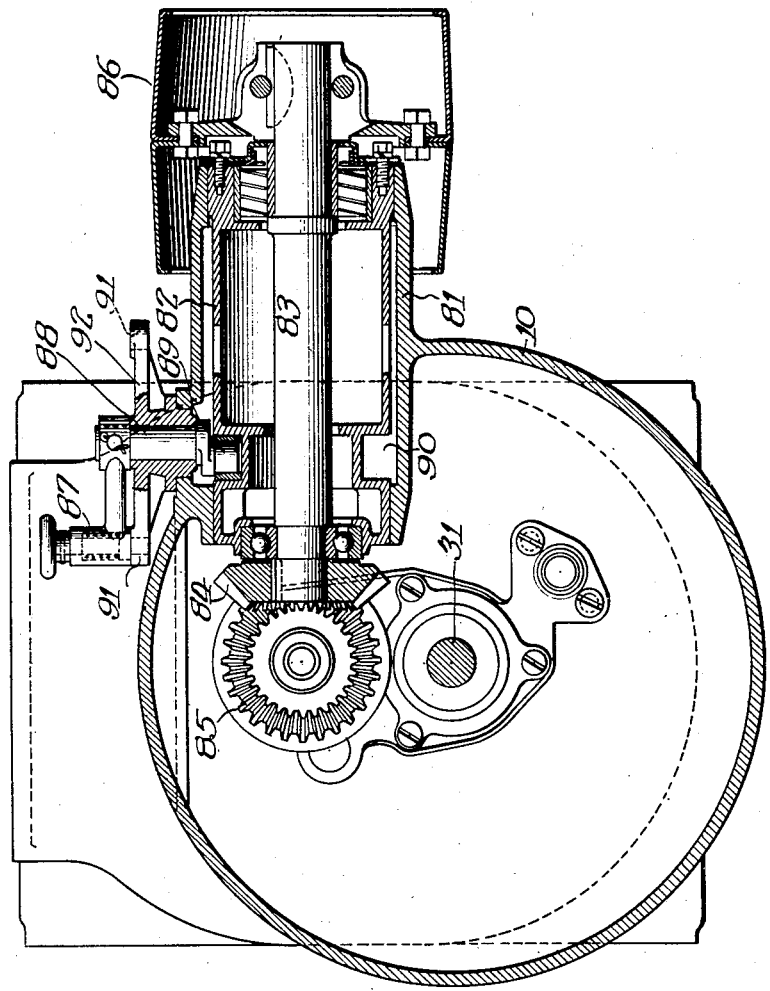

UNITED STATES PATENT OFFICE.

JOHN RIISE, OF DOYLESTOWN, OHIO.

TRACTOR.

1,355,501.     Specification of Letters Patent.     Patented Oct. 12, 1920.

Application filed March 27, 1919. Serial No. 285,542.

*To all whom it may concern:*

Be it known that I, JOHN RIISE, a subject of the King of Norway, residing at Doylestown, in the county of Wayne and State of Ohio, have invented certain new and useful Improvements in Tractors, of which the following is a specification.

This invention relates to tractors.

One object of the invention is to provide a simple, durable, compact and efficiently operable tractor, comprising a plurality of separable and coöperating units adapted to facilitate assembling, disassembling and repair of the tractor.

Another object is to improve tractor power transmission systems and provide an efficient one, the parts of which coöperate in a novel manner to meet successfully all of the rigid requirements of service conditions.

These and other objects are accomplished by means of the tractor construction shown on the accompanying sheets of drawings, in which—

Figure 1 is a side elevation of my tractor;

Fig. 2 is an enlarged plan view of the same;

Fig. 3 is a detail view, parts being in section, of the rear axle and transmission connections to the traction wheels, the section being taken in the plane of line 3—3 of Fig. 4;

Fig. 4 is a longitudinal sectional view through the main gear casing and the differential casing secured thereto, showing various parts of the transmission in operative association;

Fig. 5 is a view of the differential and other power transmission members taken in the plane of line 5—5 of Fig. 4; and, Fig. 6 is a detail sectional view taken in the plane of line 6—6 of Fig. 4, and showing the mechanism by means of which the pulley may be moved into and out of gear.

The various novel features of my invention will be apparent from the following description and drawings and will be particularly pointed out in the appended claims.

This tractor has a frame comprising a plurality of coöperating separably-connected casings, the main casing 10 forming substantially the rear half of the frame, and the engine casing 11 substantially the front half of the frame. These two casings 10 and 11 are secured to each other by any suitable means, such as bolts 12. Secured to opposite sides of the main casing 10 (see Figs. 2, 3 and 5) by bolts 13 are traction wheel supporting casings 14, and secured to the rear end of the main casing 10 is a casing or removable cap 16 which supports the differential mechanism, the first speed reduction gearing and final reduction pinions to be referred to hereinafter. By referring to Fig. 3 of the drawings, it will be noted that each of the traction wheel supporting casings 14 is provided with an annular shoulder 17 fitting within the circular flanges 18 of the casing 10 for properly centering the parts in question. Similarly, the differential carrying casing 16 has an annular flange 19 fitting within the annular flange 20 at the rear end of the main casing 10. In a similar manner, the front end of the main casing and the rear end of the engine casing 11 are connected to each other. It is seen, therefore, that the main frame of the tractor includes five casings separably connected to each other to form a rigid frame, each part in addition to forming a part of the main frame also performing other functions to be mentioned later.

This tractor is of the four-wheel type, there being two rear traction wheels 21 and two front steering wheels 22, the latter two of which are operatively connected by a steering connection 23, which in turn is operatively connected to the steering wheel 24 mounted over the main casing 10, to which also is secured an operator's seat 25 located adjacent the steering wheel 24. The engine, as shown, is a four cylinder vertical engine, the crank case being the portion which is secured to the main casing 10. This engine is of the water-cooled type, there being provided therefor a radiator 26 for cooling purposes. A change speed and reverse gear control lever 27 is located conveniently to the operator's seat 25, as also is a pedal 28 which is operatively connected to the brake mechanism through a connection 29 and clutch mechanism through a connection 30.

Power from the engine is transmitted through the engine crank shaft to a connecting shaft 31 (see Fig. 4) supported by bearings 32 mounted within a vertical supporting wall 33 of the main casing 10. Secured to one end of this shaft is a spur gear 34, through which power from the engine is transmitted to a sleeve transmission member 35 through suitable variable speed and reverse gear mechanism designated generally by the reference character 36, and which change speed and reverse mechanism is controlled by the lever 27. One end of the main transmission shaft 39 is mounted within the gear 34 and the other end is mounted in bearings 37 carried in a second vertical wall 38 formed within the main casing 10. The sleeve transmission member 35 is separably connected to a shaft 40 having a worm 41, the shaft 40 being supported entirely within a barrel portion 42 of the removable casing 16 which supports at its opposite ends bearings 43 and 44 in which the shaft 40 is rotatably mounted. The outer end of this barrel portion is closed by a screw cap 45. The worm shaft 40 is mounted within the barrel portion 42 of the removable casing member 16 before the cap 45 is set in place, said cap assisting in holding the bearings, and thereby the shaft, in position.

Meshing with the worm 41 is a worm wheel 46, which forms, with the worm 41, the first speed reduction. I prefer the worm and worm gear for the first speed reduction because they are best suited for high speed and small load. This worm wheel is mounted over and secured to a differential housing by bolts 47, (see Fig. 5), said differential housing including two separable members 48 and 49 which have vertical flanges through which the bolts 47 pass, said bolts also passing through the adjacently arranged internal vertical flange of the worm wheel 46. These separable differential housing members 48 and 49 movably support the differential bevel pinions 50 which mesh with bevel gear 51 formed at one end of each of two sleeves 52 which extend in opposite directions and which have formed at their outer ends splines for driving and seating spur pinions 53 which mesh with and drive bull gears 54. The sleeve members 52 are supported by a shaft 55 which takes the load due to transmitting power between the bull gear pinions and bull gears 53 and 54, respectively. Mounted over the sleeve members 52 and intermediate the latter and each of the differential housing members 48 and 49 at each side, is a bushing 56 of bronze, or other proper bearing metal, to take radial and side thrust pressure of the differential bevel gears, and also radial load due to the bull gear pinions, it being noted that each of these bushings 56 is provided with an annular vertical flange in addition to an annular horizontal flange. The differential pinions 50 rotate upon relatively short bearings 57, one end of each of which is mounted in a bushing 58 made of bronze, or other proper bearing metal, which engage the differential pinions 50 for taking the thrust and wear incident thereto. Each of these bushings 58 preferably is provided with four external sides to resemble a square nut and fits within a lateral slot 59, a plurality of which are formed in an inwardly projecting portion of the differential casing member 49, the outer circumferential surface of each of the bushings 58 being in the arc of a circle to fit properly within the differential casing member 48. By providing a differential of this type difficult machining required in the old types of differentials is overcome, and at the same time this differential casing or housing permits the two halves of different housings to be machined separately and are interchangeable, that is to say, any two pieces taken out of stock will fit together. Another feature overcome by this type of differential is the provision of the bushings referred to, obviating the rapid wearing of the casing material which results in separation of the gears. Surrounding the outer lateral annular sleeves 60 of the transmission casing members 48 and 49 are suitable bearing members 61 which are mounted within annular members 62 (see Fig. 4) normally held in operative position within the casing member 16 by bolts 64 passing through upper and lower lugs 65 on the annular members 62 and passing through the casing member 16. These annular members 62 have upper and lower shoulder members 63 which fit within projections 63ª on the casing member 16 whereby the whole differential is held fixed against vertical movement. All of the differential mechanism and the first speed reduction gearing, including the worm 41 and worm wheel 46, and also the bull gear pinions, are removable as a unit with the casing 16 from the main gearing casing 10, it being understood that the sleeve 35 and shaft 40 are separably connected by a sliding connection.

For lubricating the differential and associated parts, one end of a pipe 101 is arranged to scrape oil from the worm wheel 46, the oil then passing down through the pipe into an axial opening 102 in the shaft 55, and through a radial outlet 103 to the bevel pinions 50 and bevel gears 51, said outlet 103 also communicating with a spiral oil groove 104 in the outer surface of the shaft 55 for lubricating engaging surfaces of said shaft and sleeves 52.

The bull gears 54, which are located within the main gearing casing 10, are secured respectively to coöperating spider members 66 (see Fig. 3), each of which has an internally arranged toothed portion 67 to form a locking connection with a tooth portion 68 fitting within the former and formed near one end of the shaft 73, there being a spacing block 70 intermediate the end portions 69 of the shafts 73. These shaft end portions 69 and spacing block 70 normally are retained in operative association by collars 71. As mentioned hereinabove, the wheel carrying casings 14 are secured to opposite sides of the main gearing casing 10 by means of bolts 13. Mounted within these wheel carrying casings 14 are laterally spaced bearings 72 which receive the axle 73, one end of each axle 73 being operatively connected to its bull gear 54. The other end of the axle 73 is provided with axially arranged teeth 95 which mesh with corresponding teeth 96 formed on the inside of the wheel hub 74. A conical wedge 97 split throughout its length is wedged against a corresponding internal surface of the wheel hub by threaded member 75. A locker washer 99 is interposed between the nut 75 and wedge 97, there being sheet steel washers 100 between the nut and wedge to prevent damage to the parts in question. Each of the traction wheels is provided with an annular brake flange 76, coöperating with each of which is brake mechanism 77, including a shaft 78 operatively connected to the foot control lever 28. Connecting the rim and hub of the wheel are a plurality of spokes 98, one set of spokes extending from the inner end of the hub to the outer edge of the rim, the other set of spokes extending from the outer end of the hub to the inner edge of the rim, the brake flange 76 being connected to the spokes intermediate their ends and near or at their points of crossing each other. This spoke arrangement provides a rugged wheel construction. Secured to the spider 66 of each of the bull gears 54 is a wearing plate 79 which engages an associated wearing plate 80 secured to the casing 14 for preventing wearing away of the casing and the bull gear spider due to thrust. It will be noted that by removing the bolts 13 each of the wheel casings 14, with its associated traction wheel 21 and bull gear 54, may be removed, as a unit, from the main gearing casing 10, the two separate units being spaced by the spacing block 70, which may be removed with either one of the units in question. If desired the wheel 21 in each case may be removed alone by removing threaded members 75.

The main gear casing 10 (see Fig. 6) is provided with a laterally extending tubular portion 81, in which is slidably mounted a housing 82 carrying a shaft 83, to one end of which is secured a bevel gear 84, which may be moved into and out of engagement with a bevel gear 85 associated with the change speed mechanism 36. Secured to the opposite end of the shaft 83 is a general service pulley 86 which may be driven through the gears 85, 84 and shaft 83 when the gears are in mesh. As shown in Fig. 6, they are in mesh. If it is desired to move them out of mesh, the same may be accomplished by rotating a control handle 87, which is secured to a shaft 88 having at its lower end a crank arm provided with a roller or block 89 operable within an annular slot 90 of housing 82, whereby the housing, together with the pulley 86, shaft 83 and gear 84, may be moved laterally. The spring-pressed control handle 87 normally is locked in either of its positions by having a portion thereof extend into either of the openings 91 formed in a bracket 92 mounted in the tubular portion 81 of the casing 10.

From the above, it is apparent that each of the traction wheels and all of its connections, to and including the bull wheels 54, together with its wheel carrying casing 14, form separate units which may be removably secured to the main gearng casing 10. It is also apparent that the whole differential mechanism, together with the first speed reducing gearing and bull gear pinions, is mounted as a unit within the casing 16 and is removable as a unit with said casing 16 from the main gearing casing 10. At the same time the engine casing 11 as a unit is removably secured to the main gearing casing 10, the tractor thereby comprising a plurality of assembled units which when connected together form the tractor structure, the various casings referred to forming the frame of the tractor, thereby obviating the use of a separate chassis.

It is evident that there may be various modifications of the invention herein particularly shown and described, and it is my intention to cover all such modifications which do not involve a departure from the spirit and scope of the invention as set forth in the following claims.

I claim:

1. A tractor including a frame comprising a main gearing casing, an engine casing secured to one portion thereof, traction wheel supporting casings secured to other portions of said main casing, and another casing carrying differential mechanism and secured to said main casing.

2. A tractor including a frame comprising a main gearing casing, bull gears mounted in said casing, casings secured to opposite sides of said main gearing casing, traction wheels carried by said casings and being operatively connected to said bull gears, and a casing secured to the rear of said main gear casing and carrying differential mechanism operatively connected to said bull gears.

3. A tractor including a frame comprising a main gearing casing, bull gears mounted in said casing, casings secured to opposite sides of said main gearing casing, traction wheels carried by said casings and being operatively connected to said bull gears, and a casing secured to the rear of said main gear casing and carrying differential mechanism operatively connected to said bull gears, the differential mechanism being removable as a unit with its supporting casing from the main gearing casing and the bull gears being removable with the wheel supporting casings from the main gearing casing.

4. A tractor including a frame comprising a plurality of separable casings, one of said casings forming the main body portion, another of said casings supporting a traction wheel and bull gear, and another of said casings supporting differential mechanism operatively associated with said bull gear.

5. In a tractor, a main gearing casing, bull gears mounted therein, a casing secured to said main gearing casing, gearing mechanism supported by said second casing including differential mechanism and first speed reducing gearing operatively associated with the bull gears forming a part of the second speed reducing gearing.

6. In a tractor, a main gearing casing, power transmitting gearing mounted therein, a housing slidably mounted in said casing, a shaft carried by said housing, a pulley mounted on said shaft, and means whereby said housing may be shifted in said casing for moving said shaft into and out of driving relationship with the power transmission mechanism within the casing for actuating or stopping the operation of the pulley.

7. In a tractor, a gearing casing forming a portion of the tractor frame, gearing mounted therein, a casing removably secured to said main gear casing, and differential mechanism carried by said second mentioned casing and being operatively connected to the gearing within said main casing, first speed reducing gearing being carried entirely by the second casing, and second speed reducing gearing being carried in part by both of said casings.

8. In a tractor, the combination of a frame which is formed by casing members including a rear outer casing member, an annular member supported thereby, and differential mechanism mounted in said annular member.

9. In a tractor, the combination of a frame which is formed by casing members including an outer casing member, an annular member secured to said casing member, and differential mechanism movably mounted in said annular member, said annular member and casing member having shouldered engagement to retain the differential mechanism in position.

10. In a tractor, the combination of a frame which is formed by casing members including an outer casing member, differential mechanism therein, and a member supported by said casing member and embracing the differential mechanism for supporting the latter.

Signed at Akron, Ohio, this 24th day of March, 1919.

JOHN RIISE.